June 30, 1964 C. A. JOHNSON, JR 3,139,521

LOCATING DATA IN A MAGNETIC RECORDING SYSTEM

Filed May 5, 1961

INVENTOR.
CARL A. JOHNSON Jr
BY Marvin Jacobson
AGENT 3,139,521
Patented June 30, 1964

3,139,521

LOCATING DATA IN A MAGNETIC RECORDING SYSTEM

Carl A. Johnson, Jr., St. Paul, Minn., assignor to Sperry Rand Corporation, New York, N.Y., a corporation of Delaware Filed May 5, 1961, Ser. No. 107,983
7 Claims. (Cl. 235—92)

This invention relates to magnetic recording systems and more particularly to apparatus for locating information stored on a moving magnetizable surface containing scattered areas of magnetic imperfections.

Data processing systems used for processing large amounts of data usually make extensive use of moving magnetizable surfaces for storing such data. Present day equipment to a great extent utilize continuous surfaces such as the peripheral surface of a cylindrical or drum member with the surface rotating about the central axis of the cylinder, or in the form of a circular disc having a relatively flat continuous surface with the disc rotating about the central axis thereof. These devices are well known in the art. A system using a magnetic drum is described in Patent No. 2,540,654 issued to Cohen et al. A system incorporating the use of a disc member for storage purposes is described in copending application by Eckert et al. No. 485,746 filed February 2, 1955, and assigned to the assignee of this invention. In these systems, generally the surface is divided up into a multiplicity of parallel channels the width of each channel being a predetermined distance transverse to the direction of rotation of the surface and the channels being continuous in a lengthwise direction in the direction of rotation of the surface. A transducing element, commonly referred to as a magnetic head, is magnetically coupled to a selected one of the parallel channels and this transducing element is utilized for writing or storing information signals on the selected channel and for reading the information signals that had been previously stored on the channel. During the storing step, as the channel moves past the transducing element the magnetic field from the transducing element affects the magnetizable surface such as to place the section of the channel which is magnetically coupled to the transducing element in a predetermined magnetic state. This magnetic state representing the signal stored, is retained by the surface so that subsequently, upon desiring to read the information from the channel, the transducer element can be coupled again to the channel and as that corresponding section of the channel passes the magnetic transducer, the preset magnetic signal state can be detected. Systems and apparatus for reading and storing information on moving magnetizable surfaces are described in the Cohen patent supra and in copending application by Hill et al. Ser. No. 652,207 filed April 11, 1957, now Patent No. 3,064,242, and assigned to the assignee of this invention. As described in some of the foregoing patents and as well known in the art, for data processing systems it is important to determine the location for storing and reading data. In other words, the data that is stored must have an associated address such that it may subsequently be located. Since the data or information channels are usually continuous, one practice is to have an additional channel containing a single stored mark signal, this signal representing the beginning or zero address of all of the data channels, so that for addressing purposes the mark signal indicates the starting point and the address or location of the information can be determined in time and space relation to said starting point.

Since the magnetic property of the magnetizable surface is such that it is capable of maintaining one of two possible magnetic states in accordance with the magnetic field applied thereto by the transducer element, the information that is stored on said surface is in the form of binary coding. The stored data in the channels is usually in the form of blocks of data, each block containing a binary coded number or a plurality of binary coded numbers. Because of this it is not necessary to address each specific bit stored in a channel but it is only necessary to address each of the blocks so that all the information stored in each block may then subsequently be located. Each block of data can therefore be recorded in a sector of the data channels and each of these sectors is located in respect to the beginning of the channel as specified by the previously described mark signal. Some prior art devices provide the addressing or location of the blocks of information in the sectors of the data channels by assigning a predetermined length for each sector of the respective channels and placing a signal on an additional channel for each location of the beginning of a new sector on a data channel. In this manner the information contained in a give sector can be located by counting the number of sectors between the mark signal and the desired sector. In this prior art scheme all of the data channels have equal sectors and all sectors are transversely aligned with the sector-length-indicating signals stored on the additional channel. Since all of the sectors have the same location relative to the mark signal, means are provided for selectively energizing the desired data channel. For example, assume there are 10 parallel data channels, each having 100 sectors, on a drum. To locate the information stored in the 20th sector of the 5th data channel means are provided for energizing the transducer element associated with the 5th channel and the number of sectors starting from the beginning, as designated by the mark signal, are counted until the 20th sector is reached. One of the difficulties of this scheme is that when the surface has bad areas, that is, areas containing magnetic imperfections, so that information cannot be reliably stored thereon, some of the sectors in a channel are unusable for storing information. Therefore, there must be provided some means of designating which of these sectors do not contain information so that upon addressing that bad sector there is an indication that it is not utilizable.

Some prior art devices utilize a separate channel for storing a signal which is transversely aligned with the sector beginning signals in the data channels to indicate when a sector is bad, that is, when it has magnetic imperfections on the surface. In this method a single channel provides signals which are common for all of the transversely aligned sectors in the plurality of data channels. If any one of the sectors is bad due to magnetic imperfections, none of the corresponding sectors in the other channels can be utilized even though they may be good, that is be free of magnetic imperfections. This, of course, reduces the amount of available storage space. Other schemes provide for utilizing a portion of each of the sectors for storing the address of that sector so that as a sector passes a reading head its corresponding address is read out by the head so that the sector or block of information can be directly addressed. Those sectors containing magnetic imperfections, of course, do not have any address information stored thereon and therefore are not utilized. This, of course, is advantageous in that counting of the sectors is not required in order to locate information since each of the blocks of information contains its own address information. Further, only those sectors which actually have magnetic imperfections are not utilized. However, this method does have a disadvantage since a portion of each sector must be allocated for addressing purposes thereby reducing the amount of available data storage space.

In this invention the data channels are divided into a plurality of sectors of arbitrarily predetermined length. At the beginning of each sector which has good magnetic properties, i.e., free from magnetic imperfections, a single signal is stored in the form of an arbitrarily designated magnetic stable state, with the remaining portion being for storing data signals. It should be noted that the method of determining the good and bad sectors of the surface is not a part of this invention. A set of signals is stored on an additional track or channel and these signals are utilized to indicate the predetermined length of the sectors. In each of the data channels sector-beginning-signals are effectively transversely aligned with the signals in the additional channel. As the surface moves, coincidence between a signal stored on the sector-length-indicating channel and a sector-beginning signal on the selected data channel causes a change of the contents of a counter for indicating which sector is being scanned as will become apparent. In one embodiment to be subsequently described, the sector length is indicated by end carry pulses from a counter of predetermined maximum count which is incremented by signals in a timing channel. In another embodiment, the sector length is indicated by displacement between equally spaced signals on a sector channel.

Therefore, it is an object of this invention to provide an improved magnetic recording system.

It is a further object of this invention to provide an improved information locating system for a magnetic recording system.

Still another object of this invention is to provide a locating system for information in a magnetic recording system, which utilizes the maximum amount of storage space available for data storage purposes.

Yet another object of this invention is to provide a locating system for a magnetic recording system in which the addressing information and the indication of the magnetic properties is provided by a common signal.

Another object of this invention is to provide means for obtaining maximum data storage on a magnetic surface containing scattered areas of magnetic imperfections.

Still another object of this invention is to provide a magnetic recording system with a maximum amount of storage space available for storing information.

These and other more detailed and specific objects will be disclosed in the course of the following specification, reference being had to the accompanying drawings, in which.

Figure 1:
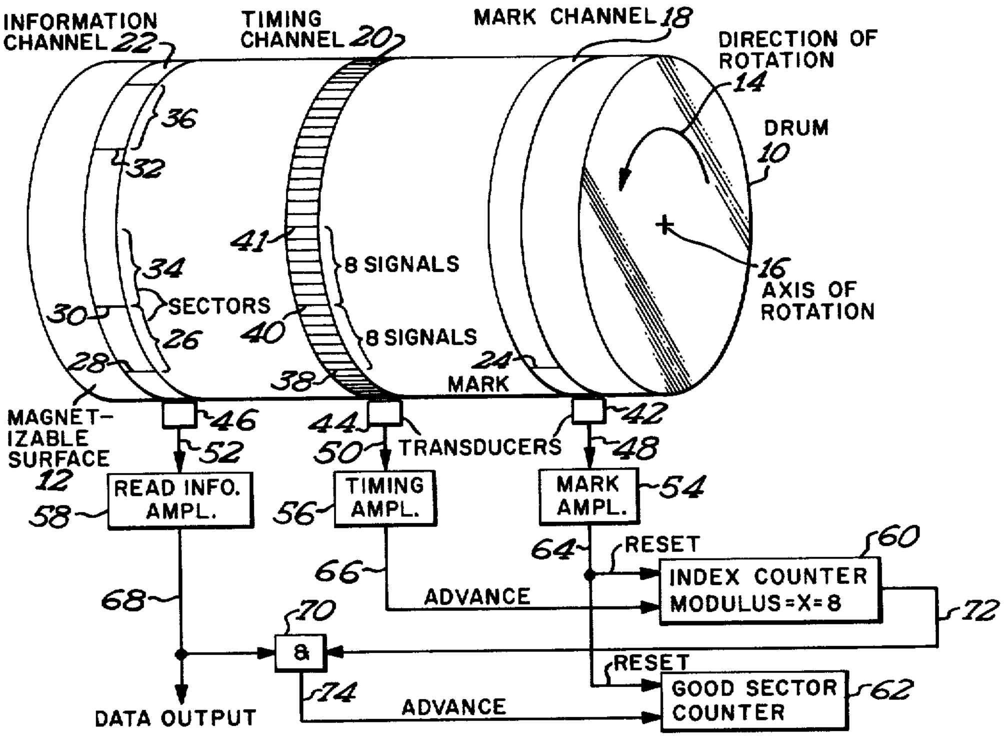
FIGURE 1 is an exemplary embodiment of this invention as utilized with a magnetic drum.

FIGURE 1 shows a cylindrical element, drum 10, having a peripheral surface 12 of a magnetizable material. There are a variety of materials which can be used for this surface, and, as is well known in the art, said material has magnetic properties such that upon application of a magnetic field to a discrete area of the surface, that discrete area retains the signal applied thereto in the form of a stable magnetic state. The material has hysteresis loop properties and therefore has basically two stable magnetic states. Although there is a third state available, a state of demagnetization, this latter state is not ordinarily used and will not be considered in this description. Although not shown in FIGURE 1, it is assumed that there is structure for mounting the magnetic drum and for driving same in the direction of rotation as shown by arrow 14 around the axis of rotation 16. The surface of the drum contains a multiplicity of parallel channels, each of which has a predetermined width transverse to the direction of rotation of the drum, and a continuous length along the surface in the direction of rotation of the drum. The multiple channels include a mark channel 18, a timing channel 20 and a plurality of information channels similar to the single one shown, channel 22. For clarity, only a single information channel is shown, although it is understood that a large plurality of information channels are usually included on a magnetic drum.

The mark channel contains a single signal, the mark signal 24, which is at a predetermined position in the mark channel 18. The information channel 22 is divided up into a plurality of sectors or blocks, such as sector 26, with all of the sectors in a given channel being of equal length. The timing channel 20 contains a plurality of equally spaced signals along the entire length of the channel. All stored channel signals are represented by solid lines transversing the channel. It should be noted that the sector length can be designated either in terms of distance along the information channel or can be designated according to the angular displacement of the drum as it continuously rotates through 360° from a predetermined zero position. Although hereinafter the description of the invention relative to FIG. 1 will refer to distances along the various channels, it is understood that terminology as regards the angular displacement or angular position is equivalent.

Since the sectors in information channel 22 are all of equal length, said length can be represented by the distance between pre-selected signals in the timing channel 20. For the purposes of this description, it will be assumed that the distance between every eighth signal on the timing channel 20 represents the distance or the length of each of the sectors in the information channel 22. The plurality of signals shown in the information channel for example signal 28, indicate the beginning of a sector which has good magnetizable characteristics on the surface area encompassed by that corresponding sector. Although not shown in FIG. 1, it is understood that in the area of each of the sectors, that is, those sectors having good magnetization characteristics, there normally is contained data or information in the form of a plurality of binary signals, this being the data or information as distinguished from sector-beginning signals, which is stored in the information channel. Those sectors encompassing surface areas having relatively poor or unstable magnetic properties so as to make them unreliable for storage purposes, do not contain any sector beginning signal or data. For example sector 26 includes sector signal 28 and would usually contain stored data, not shown. Sector signal 30 indicates the beginning of another sector 34, encompassing an area of the surface which is free from magnetic imperfections and being of length equal to that of sector 26. The next subsequent good sector after sector 34, would be sector 36 beginning with sector signal 32. The larger gap between sector signals 30 and 32 indicates a bad sector between sectors 34 and 36, that is a sector containing an area of surface which contains magnetic imperfections.

In this manner, even though the information channel is divided up into a plurality of sectors juxtapositioned lengthwise along the information channel, only those sectors which are free from magnetic imperfections have sector beginning signals associated therewith. It is apparent that with a plurality of parallel information channels, said information channels being parallel to the channel 22, each of the sectors would have corresponding transversely aligned sectors in the other information channels, each of which would have its own sector-beginning signals if the surface area is not defective.

As previously stated, the mark signal 24 in mark channel 18 indicates an arbitrarily predetermined beginning point for all of the information channels and the timing channel. Although mark signal 24 is shown to be substantially transversely aligned with sector signal 28 and timing signal 38, for reasons which will be subsequently apparent, the mark signal is slightly displaced from exact alignment. However, since signals 28 and 38 are the signals in their respective channels which are most closely aligned with the mark signal, they represent the beginning of their respective channels as designated by the mark signal. Each sector-beginning signal in the information channel is transversely aligned with a timing channel signal. Starting with the timing channel signal 38, the distance along the timing channel between every eighth signal represents the sector length of the information channels and each sector-beginning signal in the information channel is transversely aligned with a corresponding timing channel signal. For example, sector signal 30 is transversely aligned with timing channel 40 which is the eighth timing channel signal from signal 38.

Associated with each of the channels on the surface of the drum, is a transducer element represented by rectangular blocks 42, 44 and 46, each magnetically coupled to channels 18, 20 and 22 respectively. Although not shown, it is assumed that structure is provided to maintain these transducers or magnetic heads as they are commonly referred to, in magnetic coupling with the associated channels. The heads serve a dual purpose in normal use since they are utilized for writing or storing signals on the magnetizable surface and for reading the signals that had been previously stored thereon. For the purposes of this invention, the magnetic heads will only be considered to be operating in the reading mode. Additionally, with more information channels on the drum, each channel could have its own associated magnetic head with means for selectively energizing the magnetic head associated with the channel from which the information is desired to be read, or it is possible to use a single head which is movable to become selectively coupled to any of the multiplicity of information channels. Furthermore, even though only a single head is shown with each of the channels, no limitation thereto is intended since it is possible to incorporate the use of a plurality of magnetic heads for each channel for speed in locating information stored in the information channels.

The signals stored in the mark channel, timing channel and information channel respectively in the form of magnetic stable states, are converted to electrical signals by the reading heads 42, 44 and 46 respectively, and are transmitted over lead wires 48, 50 and 52 to the associated amplifiers 54, 56 and 58. The amplifiers are of any type well known in the art, and serve to amplify and shape the signals. The signal output from mark amplifier 54 is transmitted to the reset input of index counter 60 and to the reset input of good sector counter 62 via lead wire 64. The signal output appearing on lead wire 66 from timing amplifier 56 is transmitted to the advance input of index counter 60, and the signal output from read information amplifier 58 appears on lead wire 68 and is transmitted to the coincidence circuit represented by the AND circuit 70. An end-carry signal from index counter 60 on lead wire 72 provides the second input to coincidence circuit 70. In this embodiment, index counter 60 has modulus equal to 8. The counter can be of any type well known in the art, and preferably comprises a group of three bistable stages. Each advance signal applied at the input to the index counter causes it to be incremented by one and when all of the stages are set to the "1" state, the counter is considered to be full. The next subsequent advance signal resets the index counter to zero and produces an end-carry signal on lead wire 72. In this manner, the index counter repetitively counts up to eight. The coincidence or AND circuit 70 is well known in the art, and produces an output when all inputs thereto have signals. The output from the coincidence circuit appears on lead wire 74 and serves as an advance input to good sector counter 62. This latter counter is similar to the index counter; however, the modulus is not important as long as it is capable of counting up to the total number of sectors on any of the information tracks. Since the signal output from mark amplifier 54 is transmitted to the reset input of the good-sector counter 62, each time mark signal 24 is sensed by transducer 42, the good-sector counter is reset to zero and the subsequent advance signals applied thereto cause it to be incremented by each signal applied to said advance input. Whenever index counter 60 is reset either by a reset input signal from the mark amplifier, or by an advance signal when the contents of the index counter is at its maximum count, an end-carry signal is produced on lead wire 72 therefrom.

As the drum rotates to bring mark signal 24, timing channel signal 38 and sector signal 28 into magnetic coupling with their respectively associated transducer elements 42, 44 and 46, mark signal 24 in the mark channel 18 appears a short interval of time prior to the timing channel signal 38 and the sector signal 28. This is accomplished by relatively slight displacement of head 42 from transverse alignment with heads of 44 and 46, or by slight displacement of mark signal 24 from transverse alignment with signals 28 and 38, as previously stated. This is necessary in order to provide the reset signals into the counters at a time just prior to the advance signals which may be applied thereto. The sensing of mark signal 24 by head 42 provides a signal input on lead wire 48 into mark amplifier 54, and results in a signal output from said mark amplifier on lead wire 64, which serves to reset the index counter and the good sector counter, that is, to reset said counters to zero. As a result of this reset operation on index counter 60, an end-carry signal, appears on lead wire 72 and is applied as an input to coincidence circuit 70. It should be obvious that this end-carry signal must be delayed timewise some short interval to compensate for the time displacement of the mark signal relative to the signals in the timing channel and the information channel. The sensing by head 46 of sector signal 28 in information channel 22, provides a signal on lead wire 52 into read information amplifier 58, which results in a signal output therefrom on lead wire 68, which is transmitted to coincidence circuit 70. As a result of coincidence of signals on lead wire 68 and lead wire 72, an advance signal occurs at the input to good sector counter 62 on lead wire 74, indicating a first good sector. Head 44 sensing timing channel signal 38 results in a signal input on lead wire 50 into timing amplifier 56, which, in turn, provides an advance signal on lead wire 66 as an input to index counter 60, causing it to be incremented. As the subsequent timing channel signals are sensed by the head 44, the resulting advance signals on lead wire 66 increment the contents of the index counter by one for each advance signal applied thereto. When the index counter reaches its maximum count capacity, which is a count of seven, the next subsequent timing channel signal 40, sensed by the transducer 44, resets the index counter and generates an end-carry signal on lead wire 72, which is applied to the coincidence circuit. Substantially simultaneously sector signal 30 is sensed by head 46, resulting in a signal on lead wire 68 which is also applied to the coincidence circuit. The resulting output on lead wire 74 causes good sector counter 62 to advance by one, thereby making its contents equal to two. This indicates the second good sector on information channel 22. Subsequent signals on timing channel 20 cause the index counter to repeat the counting previously described until timing channel signal 41 is sensed. Again the index counter is reset to zero and an end-carry signal appears on lead wire 72. However, since no signal transversely aligned with timing channel signal 41 appears on information channel 22, no signal appears on lead wire 68 and therefore no advance signal from coincidence circuit 70 occurs at the input to good sector counter 62. The good sector counter, therefore, remains at count two, still indicating that there are only two good sectors and where they occur in relation to the beginning of the information channel as designated by the mark signal 24.

From the foregoing it can be seen that as the selected information channel moves past its associated read head, the good sectors contained therein, that is, those sectors which are free from magnetic imperfections and so are utilizable for storing data therein, are counted. For locating information stored in the selected information channel it is only necessary to count the number of good sectors contained therein until the desired sector is located, and then the data stored in that sector may be read out. The desired sector is located by counting from the beginning of the selected information channel as designated by the mark signal on the mark channel.

Figure 2:
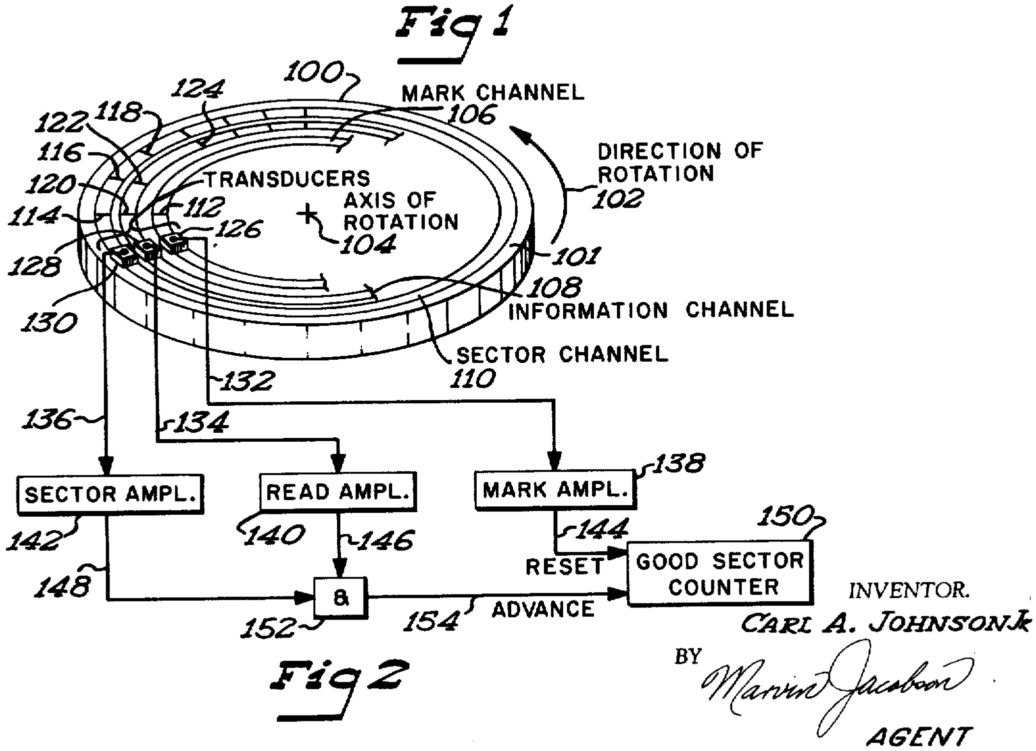
FIGURE 2 is another embodiment of this invention as utilized with a magnetic disc.

FIGURE 2 shows another embodiment of this invention as utilizable with a moving magnetizable surface in the form of a circular disc. Although each of the embodiments described herein is in relation to use with two different forms of moving magnetizable surfaces, drum and a disc, it is understood that each embodiment is not restricted to the type of surface used in the description of the invention. That is, the embodiment shown in FIG. 1 would likewise be applicable to a disc as well as other forms of moving continuous magnetizable surfaces and the embodiment shown in FIG. 2 likewise is applicable and usable in conjunction with a drum surface or other forms of surfaces.

Disc 100 has a substantially flat surface 101 consisting of a magnetizable material equivalent to that type which is well known in the art, and as briefly mentioned in relation to the drum surface of FIG. 1. By means not shown, the disc is caused to rotate about an axis 104 which is substantially perpendicular to the flat planar magnetizable surface. The direction of rotation is arbitrary and is shown to be in a counter-clockwise direction by arrow 102. Similar to the drum surface previously described, the disc surface contains a plurality of continuous concentric parallel channels, said channels being longitudinal in the direction of rotation of the surface and having a predetermined width transverse to said direction of rotation. In the figure there are shown, a mark channel 106, an information channel 108 and a sector channel 110. For clarity only a single information channel is shown, although it is understood that a large plurality could be included. The mark channel contains a single mark signal 112. The mark signal, as in the case of FIG. 1, represents the beginning of the information channels. Sector channel 110 contains a plurality of equally spaced signals, for example 114, 116 and 118, along the entire length of the sector channel. It should be noted that for clarity only a portion of the channels is shown with the signals contained therein, since this is sufficient to properly describe the invention. It is understood, of course, that the channels are continuous and equivalent types of signals would be stored along the entire length of each of the channels. The sector signals in sector channel 110 are equally spaced along the entire length of the sector channel and the displacement between each sequential signal represents the arbitrarily predetermined sector length. In relation to FIG. 2 the necessity of considering angular displacement, as briefly mentioned in relation to the embodiment in FIG. 1, is more apparent. Since all of the channels are concentric about the axis of rotation 104, projecting radially outward from said axis along the surface the channels further removed in a radial direction from the axis of rotation are, of course, longer than those closer to said axis. Therefore, even though signals on each of the channels may be transversely aligned along a radius, the distances between sequential signals in one channel is not equal to the distance between a corresponding pair of signals in another channel, and therefore, angular displacement and alignment are better terms to utilize in describing the relationships between the channel signals. It should be understood that in the following description there is a direct correlation between terminology of distances and angular displacements.

Information channel 108 contains a plurality of signals, for example 120, 122 and 124. Each of these signals represents the beginning of a block or sector encompassing a good area of the magnetizable surface, that is an area of the surface which is free from magnetic imperfections. Each of the good sector signals in the information channel is transversely aligned with a corresponding signal in the sector channel, that is, corresponding signals such as 116 and 122 appear along a radius in the plane of the surface extending outward from the axis of rotation. Wherever a sector in the information channel contains magnetic imperfections in the area encompassed by that sector, a good sector signal is not stored in the information channel at a position corresponding to the beginning of the sector.

Transducers or reading heads 126, 128 and 130 read or sense the signals stored on mark channel 106, on the information channel 108 and on the sector channel 110 respectively. As the heads sense signals in their associated channels, they provide an electrical signal on lead wires 132, 134 and 136 respectively, which transmit these signals to mark amplifier 138, read amplifier 140 and sector amplifier 142, respectively. The amplifiers amplify and shape the signals and provide outputs on lead wires 144, 146 and 148 respectively. The signal on lead wire 144 serves as a reset input to good sector counter 150 and the signals on lead wires 146 and 148 provide inputs to coincidence circuit 152. The good sector counter and the coincidence circuit are similar to those described in relation to FIG. 1. When signal inputs to the coincidence circuit are both present on lead wires 146 and 148, a signal appears on lead wire 154, which provides an advance input to the good sector counter. Each time an advance signal occurs, the contents of the good sector counter is incremented.

As surface 101 on the disc 100 is caused to rotate in the direction of arrow 102 about the axis of rotation 104, mark signal 112, good sector signal 120 and sector signal 114 are sensed by their respective reading heads 126, 128 and 130. The mark signal is displaced timewise, a small amount from the transversely aligned signals 120 and 114, for the same reason as described in relation to FIG. 1. Upon sensing mark signal 112, head 126 provides a signal on lead wire 132, which is amplified and shaped by mark amplifier 138, and transmitted therefrom over lead wire 144 into good sector counter 150 to reset the counter to zero. A very short time thereafter, and substantially simultaneously, heads 128 and 130 sense signals 120 and 114 respectively and produce signals on lead wires 134 and 136 respectively which are transmitted to their corresponding amplifiers 140 and 142. The signals from the amplifiers appearing on lead wires 146 and 148 as inputs to coincidence circuit 152, provide a signal on lead wire 154 which serves to increment the count of the good sector counter thereby indicating the occurrence of a first good sector in the selected information channel. Continued rotation of the disc in the same direction results in another advance signal occurring at the input to the good sector counter when good sector signal 122 and sector channel signal 116 are substantially simultaneously sensed by their corresponding heads. When sector channel signal 118 is sensed by its reading head, there is no signal sensed by the information channel reading head 128, and therefore there is lack of coincidence at coincidence circuit 152 and so no advance signal occurs to increment the contents of the good sector counter. Repetitive operation as the disc rotates through a full 360° in the same direction of rotation, results in the good sector counter counting the number of good sectors, that is, those sectors in the selected information channel which are free from magnetic imperfections, and thereby provide the means for locating the sector containing the desired data. The mark signal indicating the beginning of the information channel recurs every 360° of rotation and each time it occurs it serves to clear or reset the contents of the good sector counter to zero. Therefore, the count in the good sector counter indicates the location of each of the good sectors in the selected information channel in relation to the beginning of the information channel as designated by the mark signal.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. For storing information in selectively energizable parallel channels on a rotating continuous magnetizable surface having scattered areas of magnetic imperfections, wherein each channel is continuous in the direction of rotation of said surface, the improvement comprising: a plurality of sectorized data channels, each sector being equal discrete areas of the magnetizable surface and including a sector-start signal stored in each of said sectors which is free of magnetic imperfections; an additional channel containing a plurality of stored signals, the displacement between selected ones of said latter signals representing the length of said data channel sectors and the remaining of said latter signals between said selected latter signals indicating angular storage location within the respective sectors; and means responsive to coincidence between any one of said sector length signals in said additional channel and respective ones of said sector-start signals for counting the number of sectors in a selected data channel which are free from magnetic imperfections.

2. For storing information in selectively energizable parallel channels on a rotating continuous magnetizable surface having scattered areas of magnetic imperfections, wherein each channel is continuous in the direction of rotation of said surface, the improvement comprising: a plurality of sectorized data channels, each sector being equal discrete areas of the magnetizable surface and including a sector-start signal stored in each of said sectors which is free of magnetic imperfections; a first additional channel containing a plurality of pairs of stored signals, the displacement between each signal of said pairs of signals representing the length of said data channel sectors; a second additional channel storing a signal representing the beginning of all of said data channels; means responsive to coincidence between any signal in said first additional channel and each sector start signal in a selected data channel for counting the number of sectors in said selected data channel which are free from magnetic imperfections, said counting means being reset to a predetermined count by said second additional channel signal.

3. Apparatus as in claim 2 wherein each of said sector start signals in said data channels is transversely aligned with a signal in said first additional channel.

4. For storing information in selectively energizable parallel channels on a rotating continuous magnetizable surface having scattered areas of magnetic imperfections, wherein each channel is continuous in the direction of rotation of said surface, the improvement comprising: a plurality of sectorized data channels each sector being equal discrete areas of the magnetizable surface and including a stored signal at the beginning of each of said sectors that is free of magnetic imperfections; a first additional channel containing a plurality of equally spaced stored signals, the space between any two successive ones of said latter signals representing the length of said data channel sectors, each of said sector beginning signals in said data channels being substantially transversely aligned with at least one signal in said first additional channel, whereby said aligned signals occur substantially concurrently in time past a given point in space as said magnetizable surface rotates; a second additional channel storing a signal representing the beginning of all of said data channels; said second additional channel signal occurring once every revolution of said rotating magnetizable surface; counting means; means responsive to the signal on said additional channel for resetting said counting means to a predetermined count; means responsive to coincidence between any of said signals in said first additional channel and each sector beginning signal in a selected data channel for changing the count in said counting means whereby said counting means counts the number of sectors in a selected data channel which are free from magnetic imperfections.

5. For recording apparatus which includes at least one data channel, a timing channel and a mark channel, all of said channels being continuous and parallel on a rotating continuous magnetizable surface having scattered areas of magnetic imperfections, the improvement comprising: a plurality of juxtaposed sectors in the data channels, each sector being equal discrete areas of the magnetizable surface and including a stored signal at the beginning of each sector that is free of magnetic imperfections; first counting means of modulus $x$, where $x$ is equal to a predetermined number of successive signals on the timing track that represent the length of said data channel sectors, for repetitively counting $x$ successive timing track signals, means responsive to the mark channel signal for resetting said first counting means to a predetermined initial count; second counting means responsive to coincidence between each of said data channel sector beginning signals and said initial count in said first counting means for counting the number of sectors in a data channel which are free of magnetic imperfections and means responsive to the mark channel signal for resetting said second counting means to a predetermined initial count.

6. For locating data stored in a moving continuous magnetizable surface recording device having a timing channel, a mark channel and at least one information channel and having scattered areas of magnetic imperfections, the improvement comprising: a plurality of longitudinally juxtapositioned equal-length data-storing sectors in each of the information channels, each sector encompassing an area of the surface and including a signal stored at the beginning of only those sectors that are free of magnetic imperfections; means for sensing the timing channel signals; counting means coupled to said sensing means for repetitively counting from "0" a predetermined number of successive timing channel signals, said predetermined number corresponding to an information channel sector length; an AND circuit responsive to said information channel signals and to the contents of said first counting means for providing an advance signal in response to substantial coincidence of a sector beginning signal and the "0" condition of said first counting means; second counting means coupled to said AND circuit for counting the number of said advance signals thereby counting the number of good sectors in said information channel; means responsive to the mark channel signal for resetting said first and second counting means to "0" whereby the count in said second counting means indicates the number of good sectors in a given information channel between the mark channel signal and any given position on said information channel.

7. For locating data stored in a moving continuous magnetizable surface recording device having a mark channel and at least one information channel and having scattered areas of magnetic imperfections, the improvement comprising: a plurality of longitudinally juxtapositioned equal-length data-storing sectors in each of the information channels, each sector encompassing a discrete area of the surface and including a signal stored at the beginning of only those sectors that are free of magnetic imperfections; a sector channel containing a plurality of stored signals equally spaced throughout its length, the displacement between each successive ones of said latter signals corresponding to the length of said information channel sectors; AND circuit responsive to the sector beginning signals on a given information channel and said sector channel signals for developing an advance signal upon substantial coincidental occurrence of a sector beginning signal and a sector channel signal; counting means coupled to said AND circuit for counting the number of said advance signals thereby counting the number of good sectors in the given information channel; and means responsive to the mark channel signal coupled to said counting means for resetting said counting means to an initial predetermined count, whereby the count in said counting means indicates the numbered location of each good sector in the given information channel with respect to the mark channel signal.

References Cited in the file of this patent

UNITED STATES PATENTS

| | | |
|---|---|---|
| 2,540,654 | Cohen et al. | Feb. 6, 1951 |
| 2,817,829 | Lubkin | Dec. 24, 1957 |
| 2,937,368 | Newly | May 17, 1960 |